United States Patent [19]

Parrish

[11] 4,392,513
[45] Jul. 12, 1983

[54] QUICK DISCONNECT SAFETY COUPLING

[76] Inventor: Reuel C. Parrish, P.O. Box 1846, Enid, Okla. 73701

[21] Appl. No.: 232,837

[22] Filed: Feb. 9, 1981

[51] Int. Cl.³ .............................................. F16L 37/28
[52] U.S. Cl. ........................... 137/614.01; 137/614.02; 285/1; 285/311
[58] Field of Search .................. 285/1, 311, 312, 320; 137/614, 614.01, 614.02

[56] References Cited

U.S. PATENT DOCUMENTS

| 369,887 | 9/1887 | Smith | 285/1 |
|---|---|---|---|
| 466,340 | 1/1892 | Gold et al. | 285/1 |
| 1,991,343 | 2/1935 | Ball | 285/311 |
| 2,461,818 | 2/1949 | Hague | 137/614 |
| 2,478,586 | 8/1949 | Krapp | 285/312 |
| 2,641,490 | 6/1953 | Krapp | 285/309 |
| 2,770,474 | 11/1956 | Krapp | 285/312 |
| 3,195,934 | 7/1965 | Parrish | 285/312 |
| 3,379,460 | 4/1968 | Allyn | 285/312 |

OTHER PUBLICATIONS

A.P.C. Breakaway Coupling Manufactured by Alpha Process Controls (West Yorkshire) Ltd., 34 Sandholme Drive, Burley-in-Wharfedale, Ilkley, W. Yorkshire, England.

Primary Examiner—A. Michael Chambers
Attorney, Agent, or Firm—William R. Laney

[57] ABSTRACT

A coupling for connecting sections of flexible hose so that quick and safe emergency disconnection can be automatically effected. The coupling includes a female section carrying peripheral cam lever pins adjacent radial openings through the wall of the female section, and a male section sealingly engageable with the female section. The male section carries a peripheral cam groove positioned for alignment with the cam pins when the sections are joined. Each of the sections carries a valve subassembly which normally closes the open end of the respective section, but which is automatically repositioned to open the respective section when the sections are coupled. A quick disconnect latching subassembly is carried on the male section and includes cam levers cooperatively engageable with the lever pins and cam groove to cam the male section into coupling engagement with the female section, and a releasing linkage axially movable on the male section and connected to the cam levers to release the cam levers from the cam lever pins and cam groove upon undergoing such axial movement.

13 Claims, 3 Drawing Figures

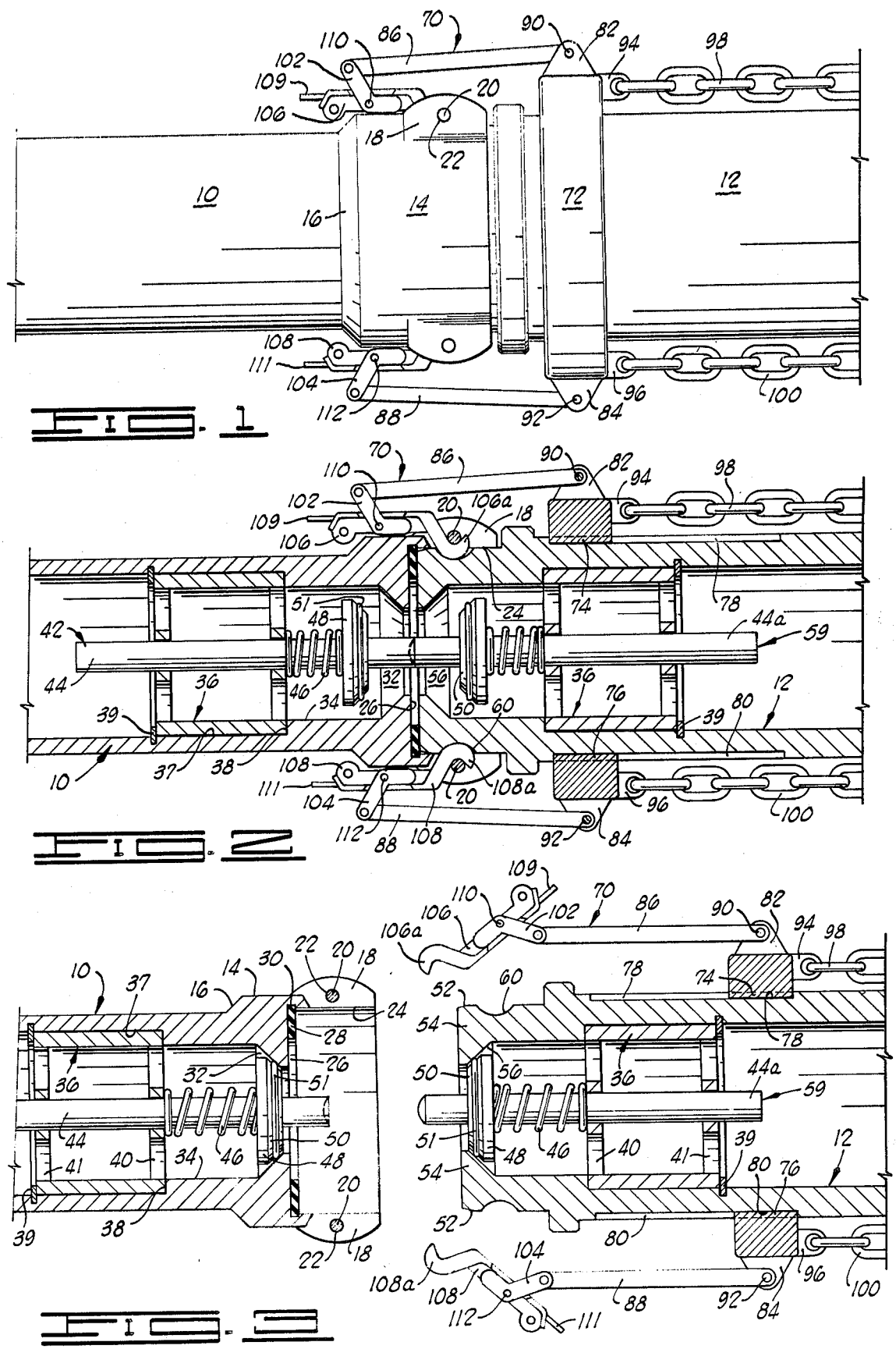

QUICK DISCONNECT SAFETY COUPLING

BACKGROUND OF THE INVENTION

1. Field of the Invention

This invention relates to safety couplings for preventing dangerous spillage of fluids upon disconnection of a pipe coupling, and more particularly, to quick disconnect couplings which automatically seal a pipeline or hose at the point of breakage when sections of the hose are pulled apart or disconnected, whether by intention or accidentally.

2. Brief Description of the Prior Art

A number of types of quick disconnect couplings are manufactured and are used to convey fluids in a number of types of industrial usage. One type of such couplings includes male and female sections which are telescoped or joined together with a sealing fit by means of leverage or a camming action which facilitates rapid connection without the need for a screw connection or a bolted connection involving placement of a number of nuts, or similar time-consuming operations. Quick disconnect couplings of this type are of the sort illustrated and described in Krapp U.S. Pat. No. 2,641,490, Parrish U.S. Pat. No. 3,195,934, and U.S. Pat. No. 2,478,586 to Krapp.

Whether a quick disconnect coupling or a bolted coupling is employed to join flexible pipe or hose sections, a danger of spillage of inflammable or explosive liquids exists where such couplings are used in conduits, pipes or hoses for transferring volatile, inflammable or explosive liquids from a transport truck to a storage facility. Typical of this type of operation is that where gasoline is transferred from a tank truck to the underground storage tanks at a service station, or to other storage facilities. Here accidents are not infrequently caused by a truck driver inadvertently driving the tanker vehicle away from the stationary storage tank prior to the time that service is shut off. As a result, the hose is inadvertently pulled free at the locus of the coupling by the shearing of connecting bolts, or breaking of camming levers and pins. Where this occurs, a very hazardous, situation is developed which may cause serious injury or loss of life due to igniting or explosion of the liquid. Even where the liquid is not ignited, and no hazard to safety is thereby developed, loss of the liquid product through spillage is often very costly where such a premature parting of the coupling results from the accidental drive-away incident described.

Recently, several attempts have been made to provide break-away couplings which will respond to tension imparted to the product line in which they are located by breaking power, but which will, simultaneously with such breaking or parting of the coupling, automatically close the opposed ends of the pipe or hose which carry the coupling parts. The liquid product is thus prevented from flowing out of the thus opened ends of the pipe at the location of the severed coupling. In one such coupling manufactured by Alpha Process Controls, Ltd. and called the A.P.C. breakaway coupling, the coupling is opened by the breaking of shear bolts used to hold the coupling parts together, and upon the opening of the coupling, valve elements carried in the two coupling parts are forced by suitable springs into closing engagement with the openings at the open end of each coupling part. Liquid contained within the two parts of the hose or pipe is thus confined and not allowed to spill upon the ground and constitute a safety hazard.

As indicated, the A.P.C. breakaway coupling relies, in its coupled status, upon the utilization of a plurality of shear bolts which require the threading of nuts on the ends of these bolts to effect coupling when product is to be discharged from a tank truck to a storage facility. Further, at the time that the shear bolts are tensioned due to inadvertent driving of the truck away from the storage facility receiving product from the truck, a flexible hose is also placed in tension and is stressed, thereby either decreasing its effective service life, or if it is already weak, possibly parting this hose at a location spaced along the hose from the breakaway coupling, thus destroying the effectiveness of the shut-off, and allowing liquid to spill through the break in the hose to develop a safety hazard, and result in a substantial loss of product.

BRIEF DESCRIPTION OF THE PRESENT INVENTION

The present invention provides a quick disconnect safety coupling which quickly and safely uncouples at a time when a vehicle discharging a liquid product through a conduit, pipe or hose containing the coupling is inadvertently driven away from the storage tank or other facility receiving product from the vehicle. The coupling of the invention is automatically disconnected without placing the hose or pipeline in which it is located in tension, so that the hose or pipeline is not stressed and damaged in the course of automatic disconnection of the coupling. Upon disconnection of the coupling, valve subassemblies contained within male and female sections constituting parts of the coupling quickly and automatically seal off the opposed parts of the coupling to prevent fluid loss from the sections of the hose which carry the parts of the coupling. Moreover, the quick disconnect safety coupling of the invention does not depend upon the severance of shear bolts or any other structural members, but rather disconnects in a way such that no part of the coupling is damaged or in any way altered in its structural configuration, thereby allowing the coupling to be reused repeatedly and over an extended service life without the requirement to replace any frangible parts which are destroyed in the process of disconnection.

Broadly described, the coupling of the invention includes a female section which carries cam lever pins at the outer periphery of the section and immediately over or adjacent radial openings through the wall of the female section. A male section is provided which sealingly engages the female section and carries a peripheral cam groove positioned on the male section for alignment with the cam pins when the male and female sections are joined.

Each of the male and female sections carries a valve subassembly which normally closes the open end of the respective section, but which is automatically repositioned to open the respective sections and place them in communication with each other so that fluid may flow through a hose or pipeline containing the coupling at the time when the sections are coupled together. A quick disconnect latching subassembly is carried on the male section and includes cam levers cooperatively engageable with the lever pins and cam groove to cam the male section into coupling engagement with the female section, and a releasing linkage which is axially movable on the male section and connected to the cam levers to release the cam levers from the cam lever pins and cam groove upon the releasing linkage undergoing such axial movement.

An important object of the present invention is to provide an improved disconnect safety coupling which will automatically quickly disconnect two hose sections from each other at a time when a truck to which one of the hose sections is engaged is driven away from the other hose section.

A further object of the invention is to provide a quick disconnect safety coupling which, in undergoing disconnection at a time when two hose parts carrying the coupling sections are pulled away from each other, does not suffer any mechanical alteration, such as the fracturing or breaking of shear bolts or the like, and which can be quickly restored to a coupling status and reused without the requirement for replacement of parts following such disconnection.

A further object of the invention is to provide a quick disconnect safety coupling which is relatively simple in its construction, is mechanically rugged, and is characterized in having a long and trouble-free operating life.

Yet another object of the present invention is to provide a quick disconnect safety coupling which imparts minimal stress to a hose or pipeline in which the coupling is located at the time that forces are applied to the quick disconnect coupling to cause the two joined parts thereof to move away from each other to a disconnected status.

Additional objects and advantages of the invention will become apparent as the following detailed description of a preferred embodiment of the invention is read in conjunction with the accompanying drawings which illustrate such preferred embodiment.

GENERAL DESCRIPTION OF THE DRAWINGS

FIG. 1 is a side elevation view of the quick disconnect safety coupling of the invention as the same appears when it is in a coupled status and employed to couple sections of a hose or pipeline to each other.

FIG. 2 is a sectional view taken substantially longitudinally through the center of the coupling illustrated in FIG. 1, and showing certain parts of the quick disconnect safety coupling in elevation for clarity of illustration and explanation.

FIG. 3 is a view similar to FIG. 2, but illustrating the quick disconnect safety coupling of the invention as it appears immediately following quick disconnection of the coupling.

DETAILED DESCRIPTION OF A PREFERRED EMBODIMENT OF THE INVENTION

The quick disconnect safety coupling of the invention, and the embodiment thereof which is illustrated in FIG. 1, includes a female section 10 and a male section 12. Although the male and female sections are illustrated as of indeterminate length, it will be understood that they can be in the form of rigid fittings connected in any suitable fashion to rigid pipeline sections or to a flexible hose. The female section 10 includes an upset end portion 14 which carries a radially inwardly sloping shoulder 16 at its axially inner end, and which is provided at circumferential intervals of 180° around the section with two pairs of radially outwardly projecting ears or lugs 18.

The lugs 18 in each of the pairs of lugs straddle, or are positioned on opposite sides of, a slot formed through the wall of the upset portion 14 of the female section 10. Immediately over this slot a cam lever pin 20 is projected between the respective pair of lugs with its ends fitted in aligned openings 22 formed in the lugs.

An enlarged counterbore 24 is formed within the upset portion 14 of the female section 10 and extends into the upset portion to the location of a radially inwardly extending shoulder 26. The shoulder 26 forms a back-up structure for an annular seal ring 28 which has its outer periphery seated in a groove 30 formed at the axially inner end of the counterbore 34. On its axially inner surface, the shoulder 26 is beveled to form a tapered valve seat 32 located adjacent an internal bore 34. A removable valve cage 36 is slidably received in a counterbore 37. The cage 36 is of generally cylindrical configuration and is retained against a shoulder 38 by a snap ring 39 received in a groove formed in the counterbore 37. At its opposite ends, the valve cage includes a pair of spider-type shaft guides 40 and 41 which are open around central hubs to permit fluid flow therethrough.

The valve cage 36 forms a part of a valve subassembly 42 which further includes an elongated valve rod 44. The hubs of the spiders 40 and 41 have central openings formed therethrough of a size to slidably accommodate the elongated valve rod 44, and to facilitate reciprocating movement of the valve rod along the axis of the female fitting 10. A compression spring element 46 of helical configuration is placed around the valve rod 44 so that one of its ends bears against the hub of the spider 40. The other end of the compression spring element 46 bears against a disc-shaped valve element 48 having a beveled surface 50 which is complementary in configuration to, and mates with, the tapered valve seat 32 on the shoulder 26. The surface 50 carries an O-ring sealing element 51.

The male section 12 of the coupling includes a tapered or beveled outer peripheral end portion 52 and a radially inwardly projecting shoulder 54. The shoulder is beveled on its axially inner surface to form a tapered valve seat 56. The valve seat 56 sealingly mates with the beveled surface 50 carried by valve element 48 forming a part of a second valve subassembly 59 which is constructed substantially identically to the valve subassembly 42 previously described and mounted in the female section 10. The parts of the valve subassembly 59 carry identical reference numerals and perform identical functions to the parts included in the valve subassembly 42, except for the valve rod 44a. It will be noted that the valve rod 44a has its end facing the female section 10 rounded to a convex configuration, whereas the end of the valve rod 44 which faces the male section 12 is of concave configuration.

A quick disconnect latching subassembly is movably mounted on the outer side of the male fitting 12 and is generally denoted by reference numeral 70. The latching subassembly 70 includes a sliding ring 72 which slidingly surrounds the outer periphery of the male fitting 12. The ring 72 is splined to the fitting to prevent rotation thereon by means of radially inwardly projecting keys 74 and 76 which are slidably movable in key ways 78 and 80, respectively, located 180° from each other around the external periphery of the male fitting 12. The key ways 78 and 80 extend for a limited axial distance along the male fitting 12 and thus limit the magnitude of axial movement permitted to the ring 72.

At locations around the ring 72 and in alignment with the keys 74 and 76, the ring carries pairs of radially outwardly projecting ears 82 and 84 which act as points of pivotal connection for major pull links 86 and 88 forming parts of releasing linkages included in the latching subassembly. The major pull links 86 and 88 are pivotally connected to the ears 82 and 84, respectively, by high strength pivot pins 90 and 92. The ring 72 also has secured thereto at a location in alignment with ears 82 and 84, a pair of axially projecting eyes 94 and 96 which function as points of securement for safety chains 98 and 100. The opposite ends of the safety chains 98 and 100 (which are not illustrated) are connected, during use of the coupling, to any suitable stationary structure, and function during the utilization and operation of the coupling in a manner hereinafter described.

Crank links 102 and 104 form additional elements in the releasing linkage. Each is pivotally connected at one end to the opposite end of a respective pull link 86 or 88 from its end which is connected to the respective ears 82 or 84. It will be noted in referring to the drawings that the crank links 102 and 104 are generally L-shaped in configuration with an obtuse angle defined between the intersecting legs of each of the crank links. At the insersection of the legs of each crank link 102 and 104, the respective chain link is pivotally connected to a cam lever. Thus, the crank link 102 is connected to cam lever 106 and the crank link 104 is connected to cam lever 108. The cam levers 106 and 108 are elongated elements having hand plates 109 and 111 at one end thereof, and having curved camming toes 106a and 108a, respectively, at the opposite end thereof. The camming toes 106a and 108a are generally hook-shaped in configuration, having a concave inner side for engagement with the cam lever pins 20 in a manner and for a purpose hereinafter described. Moreover, the arcuate outer side of each of the toes 106a and 108a is convexly rounded in a manner which, when the cam levers are utilized to connect the coupling in the manner shown in FIG. 2 and hereinafter described in greater detail, functions to bias the male section 12 into the female section 10 with the end face of the male section pressed against the annular sealing ring 28 to effect a tight seal between the two coupling sections. The two cam levers 106 and 108 are pivotally connected by high strength pivot pins 110 and 112 to the crank links 102 and 104 at the elbow in the crank links where the two legs thereof meet.

In the use and operation of the quick disconnect safety coupling of the invention, the female fitting or section 10 will generally be connected to a hose extending from a source of supply of a fluid to be transferred to some point via a flexible hose or pipe in which the coupling is located. The source of supply may typically be an over-the-road transport truck, such as those used to transport gasoline. The male fitting 12 and the quick disconnect latching subassembly 70 carried thereon may either be carried on the truck or may be located at the place where the fluid is to be unloaded or transferred.

Before commencing to pump the liquid through the pipe or flexible hose, the male section 12, connected to hose typically extending to a storage tank, is inserted into the enlarged counterbore 24 at the open end of the female section. This positions the annular cam groove 60 extending around the outer periphery of the male section 12 in alignment with the slots or openings formed radially through the upset end portion 14 of the female section 10. It will be recalled that these slots or openings are at a position of alignment between the projecting ears or lugs 18.

With the male section 12 thus positioned in relation to the female section 10, the quick disconnect latching subassembly is pulled axially along the male section until it is possible to hook the curved camming toes 106a and 108a of the cam levers 106 and 108 under the cam lever pins 20 with the concave side of the toes engaging the pins, and the convex side thereof bearing against the surface of the male section which defines the cam groove 60. The cam levers 106 and 108 can then be pivoted in an axial direction toward the outer peripheral surface of the female section 10 until a camming action commences to occur which forces the male section into the female section so that the end face of the male section bears against the annular seal ring 28 which is made of an elastomeric material. Continued manual pivotation of the cam levers 106 and 108 by means of the hand plates 109 and 111 carried at one end thereof forces the male section into tight sealing engagement with the annular seal ring. After the cam levers 106 and 108 are snapped downwardly into positions in which the cam levers 106 and 108 extend parallel to the axis of the female section 10, as shown in FIG. 2, they effectively lock the male section in sealed relation to the female section.

At this point, the sliding ring 72 of the quick disconnect latching subassembly 70 has been moved axially to the ends of the key ways 78 and 80 which are closest to the female section. Further, the crank links 102 and 104 are pivoted back to the positions illustrated in FIG. 2 in which one leg of each crank link bears against the outer periphery of the upset end portion 14 of the female section 10.

When the female and male sections 10 and 12 are coupled in the manner described, it will be noted that the convex end of the elongated valve rod 44a carried in the second valve assembly 59 has registered with the concave end of the valve rod 44 forming a part of the first valve subassembly 42 carried in the female section, and that the disc-shaped valves 48 have been forced axially into their respective coupling sections so as to compress their respective compression springs 46. This movement causes the disc-shaped valve elements 48 to be displaced from the tapered valve seats 32 and 56 carried by the female and male sections, respectively. The engaged coupling sections are thus open to passage of fluid therethrough.

As a final step in preparing to transfer a fluid through the coupling, the safety chains 98 and 100 are connected to some stationary object in the vicinity of the coupling. The safety chains are connected so that there is less slack in these chains than exists in the hose or pipe to which the male section 12 is connected, and which extends from the coupling to the storage facility receiving the fluid.

The fluid to be transferred can now be pumped through the coupling. As the fluid reaches the coupling, the openings provided through the spiders 40 and 41 of the valve subassemblies 42 and 59 allow the fluid to pass easily through these valve subassemblies. Moreover, the disc-shaped valves 48 are moved axially away from the valve seats 32 and 56 a sufficient distance to minimize the pressure drop occurring as the fluid passes through the coupling.

In the event the driver of a truck carrying the female section 10 should inadvertently start to drive the truck away from the location to which the fluid is being transferred, tension will initially be transmitted to the coupling through the hose or pipeline section which is connected to the female section 10. Movement will also be transmitted through the coupling to the male section 12. As the male section 12 commences to be pulled toward the truck, the slack in the safety chains 98 and 100 is removed and these chains become taut prior to the time that significant tension is developed in the pipeline or hose in which the coupling is located. With the tensioning of the safety chains 98 and 100, the sliding ring 72 is caused to move axially along the male section 12 away from the female section 10. The ring 72 is prevented from rotating on the male section by the keys 74 and 76 which engage the key ways 78 and 80. As the ring 74 moves along the male section, the pull links 86 and 88 commence to pull on the outer ends of the crank links 102 and 104. These links are then caused to pivot about the pivot pins 110 and 112, with the result that the radially inner legs of the crank links 102 and 104 are pivoted inwardly against the outer peripheral surface of the upset end portion 14 of the female section 10. In undergoing this motion, the crank links force the cam levers 106 and 108 outward by lever action.

Continued pull exerted on the crank links 102 and 104 by the pull links 86 and 88 causes the cam levers 106 and 108 to pivot outwardly sufficiently far that the camming toes 106a and 108a carried thereon become disconnected from the cam lever pins 20. At this point, the male section 12 is completely free from, and clear of, the female section 10, and can pull away therefrom as shown in FIG. 3 of the drawings. As the male section 12 moves away from the female section 10, the disc-shaped valves 48 of the valve subassemblies 42 and 59 are snapped to a closed position in which these valves seal tightly against the tapered valve seats 32 and 56. A minimal amount of fluid (approximately the volume which is defined between the location of the valve seats when they are forced apart in the closed position of the coupling) will be spilled on the ground, thus representing very little wastage and minimizing the safety hazard.

Although a preferred embodiment of the invention has been herein illustrated and described in order to afford sufficient guidance to enable those skilled in the art to practice the invention in accordance with its principles, it will be understood that various changes and innovations in the illustrated and described structure can be effected without departure from such basic principles. Changes and innovations of this type are therefore deemed to be circumscribed by the spirit and scope of the appended claims or resonable equivalents thereof.

What is claimed is:

1. A quick disconnect safety coupling comprising:
   an open-ended female tubular section having radial openings through the wall thereof adjacent its open end;
   cam lever pins on the female section adjacent the openings;
   a tubular male section sealingly engageable with the female section and having a cam groove in the outer periphery thereof positioned for alignment with said openings when the male and female sections are engaged;
   valve means in said sections for closing each of said sections when the sections are disengaged from each other, and opening the sections to fluid flow through both sections when the sections are engaged; and
   a quick disconnect latching subassembly on the male section and releasably engaging the cam lever pins and cam grooves, said latching subassembly including:
   axially slidable means mounted on said male section for axial movement on said male section toward and away from said female section; and
   link means extending from said axially slidable means to a location adjacent said cam lever pins, said link means comprising:
   a pull link pivotally connected to said ring;
   a crank link pivotally connected to said pull link; and
   a cam lever having a first end pivotally connected to the crank link and a second end releasably connected to one of said cam lever pins and engaging said cam groove.

2. A quick disconnect safety coupling comprising:
   a first tubular coupling section;
   a second tubular coupling section;
   lever means detachably and pivotally connected to said first section and including a camming portion contacting said second section and camming said second section into sealing engagement with said first section;
   linkage means connected to said lever means and connected to said second section for movement thereon in a direction away from said first section, said linkage means comprising:
   axially slidable means mounted on said second tubular section for axial movement on said second tubular section away from said first tubular section;
   a flexible member connected to said axially slidable means for pulling said axially slidable means axially along said second section and away from said first section when said flexible member is tensioned; and
   link means extending from said axially slideable means in an axial direction relative to said first and second tubular sections, said link means comprising:
   a pull link pivotally connected to said axially slidable means; and
   a crank link pivotally connected by one of its ends to said pull link and at its other end to said lever means;
   a first valve subassembly in said first tubular coupling section and including a movable valve element effective for opening and closing said first tubular coupling section; and
   a second valve subassembly in said second tubular coupling section in contact with said first valve subassembly and including a movable valve element effective for opening and closing said second tubular coupling section whereby, when said sections are disengaged from each other, said first and second valve assemblies close each of said tubular coupling sections against fluid flow therethrough, and when said tubular coupling sections are cammed into sealing engagement with each other, said tubular coupling sections are opened to fluid flow through the coupled section in either direction of flow.

3. A safety coupling as defined in claim 2 wherein said lever means includes a pair of elongated cam levers each having a curved camming toe at one end, said camming toe including an arcuate convex surface in contact with said second section.

4. A safety coupling as defined in claim 3 wherein said crank lever is a generally L-shaped member having a pair of legs defining an obtuse angle therebetween, and having one of said legs bearing against, and extending substantially parallel to, said first section, and the other of said legs projecting outwardly from said first section.

5. A safety coupling as defined in claim 3 and further characterized as including:
   a pair of cam lever pins secured to said first section, and passing over said curved camming toes; and
   openings through said first section adjacent each of said pins and each having said arcuate convex surface of one of said camming toes extending therethrough.

6. A safety coupling as defined in claim 5 wherein said second section is characterized in having cam groove means in the outer peripheral surface thereof receiving said arcuate convex surface.

7. A quick disconnect safety coupling comprising:
   an open-ended female tubular section having radial openings through the wall thereof adjacent its open end;
   cam lever pins on the female section adjacent the openings;
   a tubular male section sealingly engageable with the female section and having a cam groove in the outer periphery thereof positioned for alignment with said openings when the male and female sections are engaged;
   valve means in said sections for closing each of said sections when the sections are disengaged from each other, and opening the sections to fluid flow through both sections when the sections are engaged; and
   a quick disconnect latching subassembly on the male section and releasably engaging the cam lever pins and cam grooves, said latching subassembly including:
      a ring around said male section and in splined interconnection thereto for axial movement on the male section;
      means on the ring for attaching a safety chain thereto; and
      link means extending from the ring to a location adjacent said cam lever pins, said link means comprising:
         a pull link pivotally connected to said ring;
         a crank link pivotally connected to said pull link; and
         a cam lever having a first end pivotally connected to the crank link and a second end releasably connected to one of said cam lever pins and engaging said cam groove.

8. A safety coupling as defined in claim 7 wherein said crank link includes a pair of intersecting legs defining an obtuse angle therebetween, and wherein one of said legs extends between the point of pivotal connection of said cam lever to said crank lever into contact with said female section at an angle to bias said point of pivotal connection outwardly when the other of the legs of the crank link is pulled toward said male section.

9. A safety coupling comprising:
   an open-ended female tubular section having radial openings through the wall thereof adjacent its open end;
   cam lever pins on the female section adjacent the openings;
   a tubular male section sealingly engageable with the female section and having a cam groove in the outer periphery thereof positioned for alignment with said openings when the male and female sections are engaged;
   a first valve subassembly in said female section and including a moveable valve element effective for opening and closing said female section;
   a second valve subassembly in said male section in contact with said first valve subassembly and including a moveable valve element effective for opening and closing said male section; and
   a quick disconnect latching subassembly on the male section and releasably engaging the cam lever pins and cam groove, said latching subassembly including:
      a ring around said male section and in splined interconnection thereto for axial movement on the male section;
      means on the ring for attaching a safety chain thereto; and
      link means extending from the ring to a location adjacent said cam lever pins.

10. A safety coupling as defined in claim 9 wherein said latching subassembly includes cam levers each having a curved end portion engageable with one of said cam lever pins while concurrently in camming contact with said cam groove.

11. A safety coupling as defined in claim 10 wherein said link means comprises:
    a pull link pivotally connected to said ring;
    a crank link pivotally connected to said pull link; and
    a cam lever having a first end pivotally connected to the crank link and a second end releasably connected to one of said cam lever pins and engaging said cam groove.

12. A safety coupling as defined in claim 11 wherein each of said valve subassemblies includes:
    a valve rod having a first and a second end;
    a valve carried on the rod; and
    spring means bearing against said valve for biasing the valve and rod to a valve closing position, said rods being aligned axially and in contact with each other to force said valves to a valve opening position when said coupling sections are engaged in abutting, sealed relation.

13. A safety coupling as defined in claim 12 wherein each of said valve subassemblies further comprises a valve cage slidably and removably mounted in the respective coupling section and reciprocably receiving and guiding the valve rod of the respective valve subassembly.

* * * * *